(12) United States Patent
Nakamura

(10) Patent No.: US 12,322,170 B2
(45) Date of Patent: Jun. 3, 2025

(54) INFORMATION PROCESSING APPARATUS AND CONTROL METHOD THEREOF, AND LEARNING APPARATUS

(71) Applicant: CANON KABUSHIKI KAISHA, Tokyo (JP)

(72) Inventor: Koichiro Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 17/878,354

(22) Filed: Aug. 1, 2022

(65) Prior Publication Data

US 2023/0067730 A1    Mar. 2, 2023

(30) Foreign Application Priority Data

Aug. 31, 2021    (JP) .................................. 2021-141650

(51) Int. Cl.
*G06V 10/82*    (2022.01)
*G06V 10/764*    (2022.01)

(52) U.S. Cl.
CPC ............ *G06V 10/82* (2022.01); *G06V 10/764* (2022.01)

(58) Field of Classification Search
None
See application file for complete search history.

(56) References Cited

U.S. PATENT DOCUMENTS

| | | | |
|---|---|---|---|
| 11,714,877 B1* | 8/2023 | Shoshan | G06V 10/774 |
| 2021/0034493 A1* | 2/2021 | Liu | G06F 11/3438 |
| 2023/0316278 A1* | 10/2023 | Zhang | G06F 18/253 |
| | | | 705/44 |

OTHER PUBLICATIONS

A Survey on Metric Learning for Feature Vectors and Structured Data, by Bellet et al., arXiv:1306.6709v4 [cs. LG] Feb. 12, 2014 (Year: 2014).*
Zhu, Y. et al., "Spherical Feature Transform for Deep Metric Learning" ECCV (Nov. 2020) pp. 420-436.
He, K. et al., "Identity mappings in deep residual networks" ECCV (Jul. 2016) pp. 1-15.
Hadsell, R. et al., "Dimensionality Reduction by Learning an Invariant Mapping" Proc. CVPR (Jun. 2006) pp. 1-8.
Deng, J. et. al., "ArcFace: Additive Angular Margin Loss for Deep Face Recognition" CVPR (Jun. 2019) pp. 4690-4699.

(Continued)

*Primary Examiner* — Vikkram Bali
(74) *Attorney, Agent, or Firm* — Carter, DeLuca & Farrell LLP

(57) ABSTRACT

An information processing apparatus comprises: a first obtaining unit configured to obtain feature vectors related to a first category from a vector group; a second obtaining unit configured to obtain feature vectors related to a second category from the vector group; a calculation unit configured to calculate a transformation matrix for converting a projection source vector obtained based on a feature vector obtained by the second obtaining unit into a projection destination vector obtained based on a feature vector obtained by the first obtaining unit; and a generation unit configured to generate a pseudo feature vector related to a third category by performing conversion processing on feature vectors included in the feature vectors obtained by the second obtaining unit using the transformation matrix.

11 Claims, 18 Drawing Sheets

(56) References Cited

OTHER PUBLICATIONS

Yin, X., "Feature Transfer Learning for Face Recognition With Under-Represented Data" 2019 IEEE/CVF Conference on Computer Vision and Pattern Recognition (CVPR) (Jun. 2019) pp. 5697-5706, https://ieeexplore.ieee.org/document/8953809.

Notice of Reasons for Refusal issued by the Japanese Patent Office on Apr. 18, 2025 in corresponding JP Patent Application No. 2021-141650, with English translation.

* cited by examiner

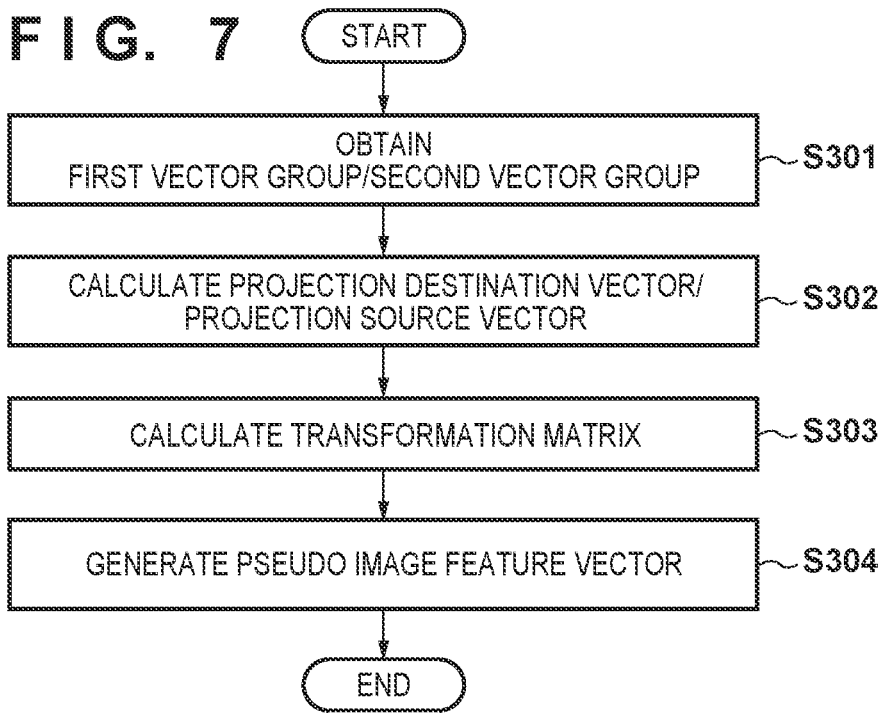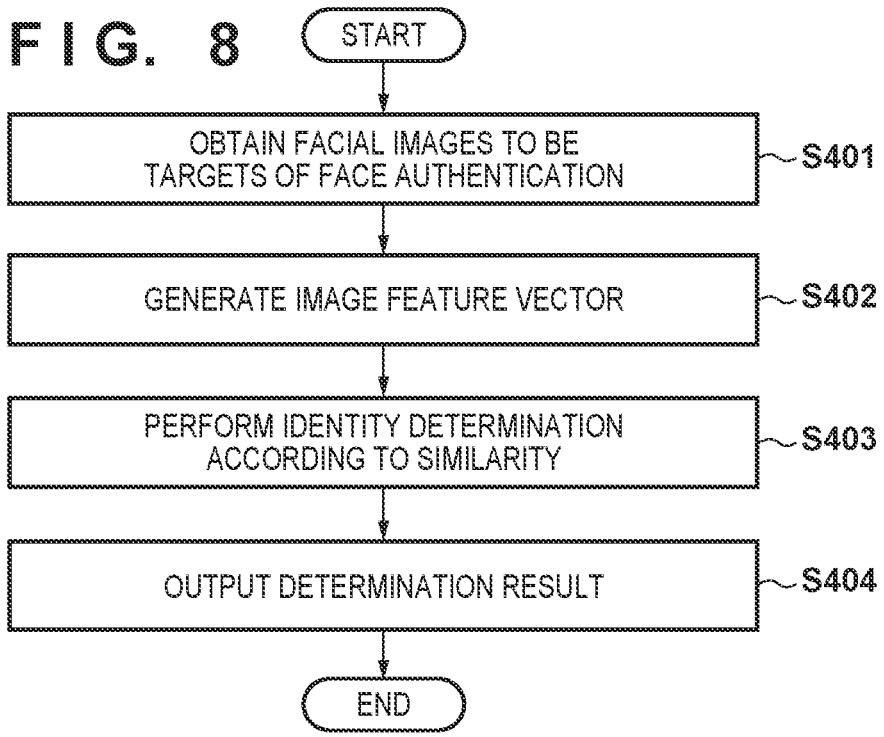

FIG. 18
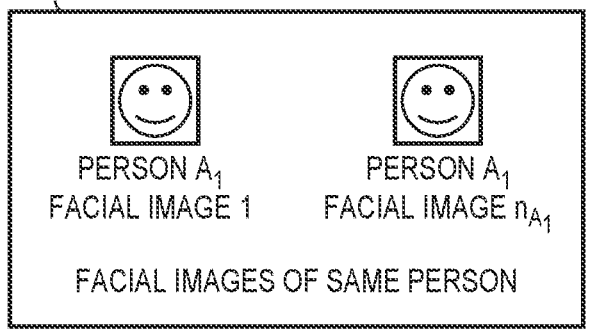
1801 Positive SET
PERSON A₁ FACIAL IMAGE 1
PERSON A₁ FACIAL IMAGE $n_{A_1}$
FACIAL IMAGES OF SAME PERSON
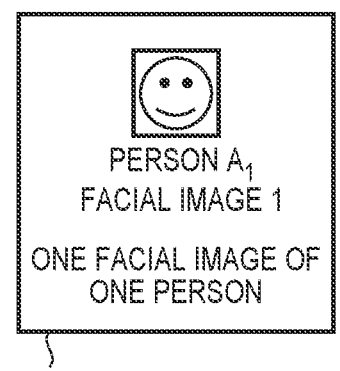
Pseudo SET
PERSON A₁ FACIAL IMAGE 1
ONE FACIAL IMAGE OF ONE PERSON
1803
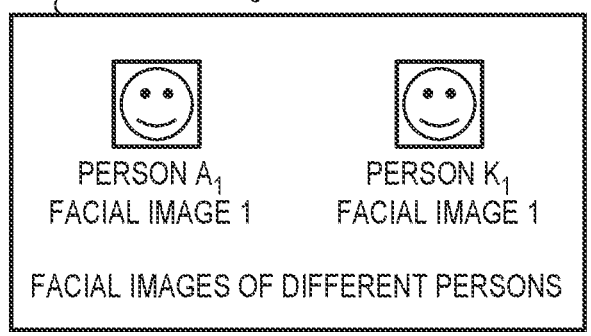
1802 Negative SET
PERSON A₁ FACIAL IMAGE 1
PERSON K₁ FACIAL IMAGE 1
FACIAL IMAGES OF DIFFERENT PERSONS

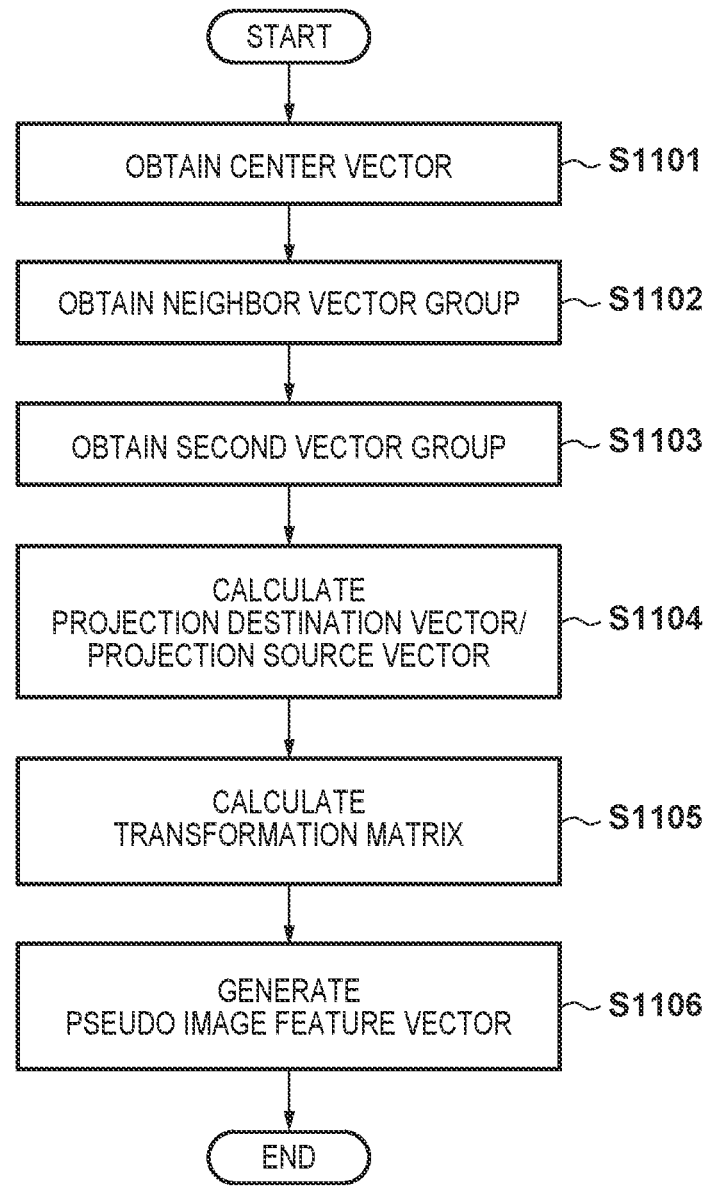

INFORMATION PROCESSING APPARATUS AND CONTROL METHOD THEREOF, AND LEARNING APPARATUS

BACKGROUND OF THE INVENTION

Field of the Invention

The present invention relates to a technique for generating data.

Description of the Related Art

In distance metric learning in which a distance between data is learned, it is expected that the accuracy of learning will be improved by increasing the diversity of training data. Therefore, a method for increasing data diversity in a feature space and then applying the results to learning has been proposed. Yuke Zhu, Yan Bai, Yichen Wei, "Spherical Feature Transform for Deep Metric Learning", in ECCV 2020 (Non-Patent Document 1) proposes a technique for converting data belonging to one category into data belonging to another category in a feature space.

In distance metric learning, the number of categories of training data greatly affects performance. The number of categories corresponds to—in distance metric learning for face authentication, for example—the number of persons included in the training data. However, although the method of Non-Patent Document 1 is able to increase data diversity within an existing category, it is not able to increase the number of categories.

SUMMARY OF THE INVENTION

According to one aspect of the present invention, an information processing apparatus comprises: a processor; and a memory containing instructions that, when executed by the processor, cause the processor to function as: a first obtaining unit configured to obtain one or more feature vectors related to a first category, from a vector group including a plurality of feature vectors, each associated with a category; a second obtaining unit configured to obtain from the vector group one or more feature vectors, at least one related to a second category different from the first category; a calculation unit configured to calculate a transformation matrix for converting a projection source vector obtained based on a feature vector obtained by the second obtaining unit into a projection destination vector obtained based on a feature vector obtained by the first obtaining unit; and a generation unit configured to generate a pseudo feature vector related to a third category different from the first category and the second category by performing conversion processing on one or more feature vectors included in the feature vectors obtained by the second obtaining unit using the transformation matrix.

The present invention generates diverse data in a feature space.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a detailed flowchart for generation of a pseudo image feature vector (step S205).

FIG. 8 is a flowchart for explaining inference processing in the first embodiment.

FIG. 18 is a diagram illustrating training sets created by processing for creating a training set.

FIG. 19 is a detailed flowchart for generation of a pseudo image feature vector.

DESCRIPTION OF THE EMBODIMENTS

Figure 1:
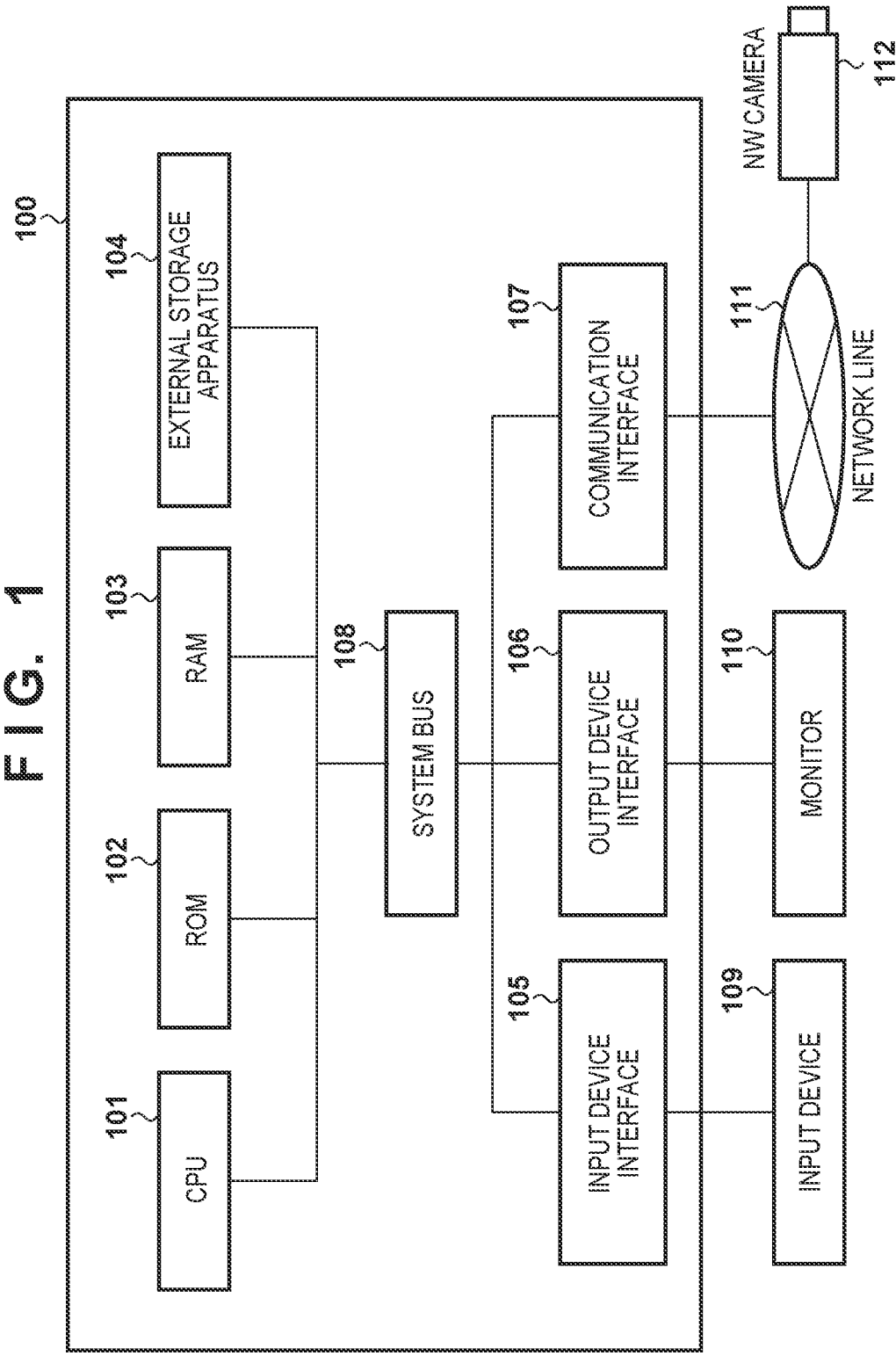
FIG. 1 is a diagram illustrating a hardware configuration of an information processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A description will be given below using a learning apparatus that generates a pseudo image feature vector based on training data including a plurality of image feature vectors and uses it to train a neural network as an example of a first embodiment of an information processing apparatus according to the present invention. A description will also be given for an inference apparatus that uses a neural network obtained by learning. In the following, first, a hardware configuration of an information processing apparatus that can be used in the learning apparatus and/or inference apparatus will be described with reference to FIG. 1. Thereafter, a description will be given for the learning apparatus with reference to FIGS. 2 and 4 to 7 and the inference apparatus with reference to FIGS. 3 and 8.

<Hardware Configuration>

FIG. 1 is a diagram illustrating a hardware configuration of a computer apparatus 100 that is the information processing apparatus that can be used in the learning apparatus and/or inference apparatus to be described below.

A central processing unit (CPU) 101 controls the entire computer apparatus 100. A read only memory (ROM) 102 stores programs and parameters that do not require modification. A random access memory (RAM) 103 temporarily stores programs and data supplied from an external apparatus and the like. An external storage apparatus 104 is a storage apparatus, such as a hard disk and a memory card. The external storage apparatus 104 may include an optical disk, such as a flexible disk (FD) and a compact disk (CD), that can be attached and detached to and from the computer apparatus 100, a magnetic or optical card, an IC card, a memory card, and the like.

An input device interface 105 is an interface with an input device 109. The input device 109 is, for example, a pointing device, a keyboard, and the like that input data in response to a user's operation. An output device interface 106 is an interface with a monitor 110 for displaying data held in the computer apparatus 100 and supplied data.

A communication interface 107 is a communication interface for connecting to a network line 111, such as the Internet, and is connected to a NW camera 112 via the network line 111, for example. The NW camera is an image capturing apparatus, which generates image data by image capturing. A system bus 108 is a transmission path that connects the respective units in the computer apparatus 100 so as to be capable of communication. Each process to be described later is realized by the CPU 101 reading and executing a program stored in a computer-readable storage medium, such as the ROM 102.

<Functional Configuration of Learning Apparatus>

Figure 2:
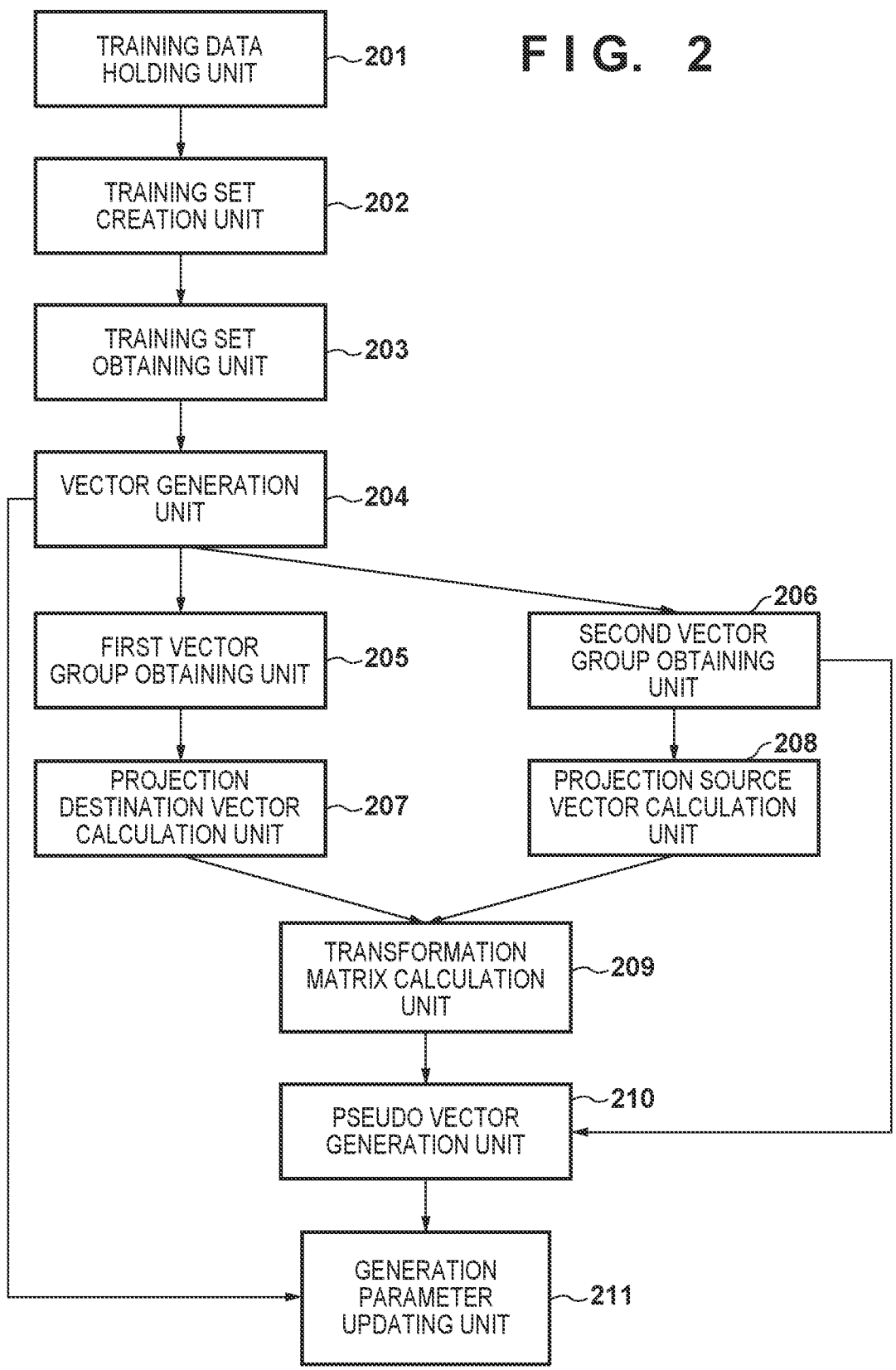
FIG. 2 is a diagram illustrating a functional configuration of a learning apparatus according to a first embodiment.

FIG. 2 is a diagram illustrating a functional configuration of the learning apparatus according to the first embodiment. The learning apparatus trains a machine learning model for face authentication. In the present embodiment, an image feature vector representing a facial image of a new person not included in given training data is generated by converting an image feature vector representing features of a facial image of a person included in the training data, and then applied to learning.

A training data holding unit 201 holds training data stored in the external storage apparatus 104. The training data includes facial images and person IDs. Here, a person ID is ID information that is the same for the same person.

Figure 4:
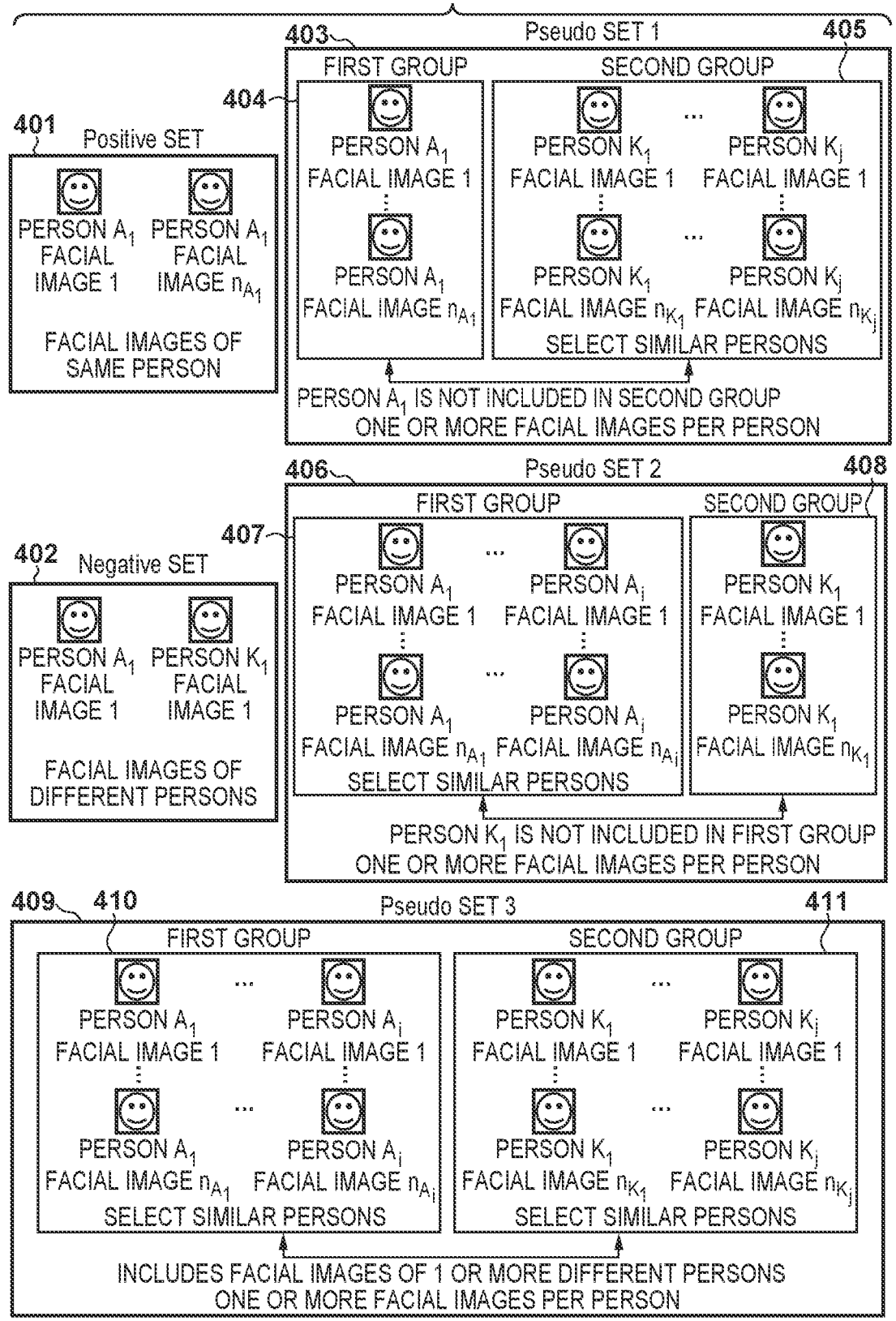
FIG. 4 is a diagram illustrating training sets created by processing for creating a training set.

A training set creation unit 202 extracts a plurality of image data held in the training data holding unit 201 and creates training sets. There are three patterns of training sets, a Positive set, a Negative set and a Pseudo set. Further, regarding the Pseudo set, there are three types of Pseudo sets, which will be described below. FIG. 4 is a diagram for explaining training sets created by processing for creating a training set.

A Positive set 401 is configured by two facial images of the same person. In the present embodiment, a plurality of Positive sets are created by all possible combinations of facial images held in the training data holding unit 201. A Negative set 402 is configured by two facial images of different persons. In the present embodiment, a plurality of Negative sets are created by all possible combinations of facial images held in the training data holding unit 201. Regarding the Pseudo set, there are three Pseudo sets 403, 406, and 409.

The Pseudo set 403 is configured by a first group 404 and a second group 405. The first group 404 includes one or more facial images associated with one person (the same category). The second group 405 includes one or more facial images of each of two or more persons. It is necessary that the facial images included in the first group 404 and the second group 405 are of different persons (different categories).

Persons whose faces are similar are selected to be the two or more persons included in the second group 405. As a selection method, there is a method of giving an attribute label to each person in advance and selecting facial images of persons of the same attribute. The attribute label may be race, gender, or a label combining race and gender. However, the selection method and the attribute label to be used for selection are not limited to these.

The Pseudo set 406 is configured by a first group 407 and a second group 408. The first group 407 includes one or more facial images of each of two or more persons. The second group 408 includes one or more facial images of one person. It is necessary that the facial images included in the first group 407 and the second group 408 are of different persons.

Persons whose faces are similar are selected to be the two or more persons included in the first group 407. As a selection method and an attribute label to be used for selection, those described above for the Pseudo set 403 may be used.

The Pseudo set 409 is configured by a first group 410 and a second group 411. The first group 410 and the second group 411 include one or more facial images of each of two or more persons, and at least one person is a different person. Persons whose faces are similar are selected to be the two or more persons included in each of the first group 410 and the second group 411. As a selection method and an attribute label to be used for selection, those described above for the Pseudo set 403 may be used.

In the present embodiment, a plurality of each of the above-described three types of Pseudo sets (Pseudo set 403, Pseudo set 406, and Pseudo set 409) are created as the Pseudo sets.

A training set obtaining unit 203 obtains a training set created in the training set creation unit 202. Further, the training set obtaining unit 203 may perform data processing known as data augmentation and the like on the facial images of the obtained training set. For example, processing, such as changing a tone of a facial image and including noise in a pixel value, is performed. The data processing is not limited to these.

A vector generation unit 204 generates an image feature vector representing features of an image. As a specific method for generating an image feature vector, a convolutional neural network (CNN), which is a type of neural network, is used. The CNN extracts abstracted information from an input image by repeatedly performing processing configured by convolution processing, activation processing, and pooling processing on the input image a number of times. Units of processing configured by convolution processing, activation processing and pooling processing at this time are often called layers.

Although there are a number of known techniques, a technique of using what is called a rectified linear unit (ReLU), for example, for the activation processing employed at this time. Also, although there are a number of known techniques, a technique called maximum pooling (max pooling), for example, may be used as the pooling processing. For example, a ResNet and the like introduced in Document 1 "K. He, X. Zhang, S. Ren, and J. Sun, 'Identity mappings in deep residual networks", In ECCV 2016' and the like may be used as a structure of the CNN.

A first vector group obtaining unit 205 obtains image feature vectors generated from facial images included in a first group of a Pseudo set obtained by the training set obtaining unit 203. A second vector group obtaining unit 206 obtains image feature vectors generated from facial images included in a second group of a Pseudo set obtained by the training set obtaining unit 203.

A projection destination vector calculation unit 207 calculates a projection destination vector from a vector group obtained by the first vector group obtaining unit 205. As a specific calculation method, there are methods, such as taking an average of the vector group and taking an average of only vectors sampled from the vector group or using a weighted average instead of an average. However, the calculation method is not limited to these.

A projection source vector calculation unit 208 calculates a projection source vector from a vector group obtained by the second vector group obtaining unit 206. As a specific calculation method, there are methods, such as taking an average of the vector group and taking an average of only vectors sampled from the vector group or using a weighted average instead of an average. However, the calculation method is not limited to these.

A transformation matrix calculation unit 209 calculates a transformation matrix A satisfying Equation (1) with respect to a projection destination vector $u_X$ obtained by the projection destination vector calculation unit 207 and a projection source vector $u_Y$ obtained by the projection source vector calculation unit 208.

$$u_X = A u_Y \quad (1)$$

Specifically, first, as shown in Equation (2) and Equation (3), $u_X$ and $u_Y$ are converted into an orthonormal system using Gram-Schmidt orthonormalization.

$$n_Y = u_Y / \|u_Y\|_2 \quad (2)$$

$$n_X = u_X - (u_X^T n_Y / \|u_X - (u_X^T n_Y) n_Y\|_2 \quad (3)$$

Next, as shown in Equation (4), the transformation matrix A is calculated by applying Rodrigues' rotation formula, α is an angle between $u_X$ and $u_Y$.

$$A = I + (n_X n_Y^T - n_Y n_X^T)\sin \alpha + (n_Y n_Y^T - n_X n_X^T)(\cos \alpha - 1) \quad (4)$$

A pseudo vector generation unit 210 performs conversion processing on a vector arbitrarily selected from the vector group obtained by the second vector group obtaining unit 206 using a transformation matrix calculated by the transformation matrix calculation unit 209. A pseudo image feature vector (pseudo feature vector) is thus generated, and set as an image feature vector representing a facial image of a new person.

A generation parameter updating unit 211 updates parameters for generating an image feature vector. Specifically, updating is performed so as to reduce a distance between image feature vectors representing features of facial images of the same person (same category). Further, updating is performed so as to increase a distance between image feature vectors representing features of facial images of different persons (different categories) and an inter-vector distance between an arbitrary image feature vector and a pseudo image feature vector. As an updating method, a loss function, such as a contrastive loss described in Document 2 "Raia Hadsell, Sumit Chopra, Yann LeCun, 'Dimensionality Reduction by Learning an Invariant Mapping'. In Proc. CVPR, 2006", for example, is used.

First, parameters are updated using a loss function L shown in Equation (5) so as to reduce a Euclidean distance D between image feature vectors generated from the two facial images included in the Positive set.

$$L = \tfrac{1}{2} D^2 \quad (5)$$

In addition, parameters are updated using a loss function L shown in Equation (6) so as to increase a Euclidean distance D between image feature vectors generated from the two facial images included in the Negative set, m is a hyperparameter.

$$L = \tfrac{1}{2} \max(m - D,)^2 \quad (6)$$

Then, parameters are updated using the loss function L shown in Equation (6) so as to increase a Euclidean distance D between the pseudo image feature vector and a vector arbitrarily selected from the vector group, obtained by the first vector group obtaining unit 205, of Pseudo set.

The updating methods and loss functions to be used are not limited to these. Here, a generation parameter is a weighting coefficient of the CNN configuring the vector generation unit 204, and updating is performed by back propagation using a gradient of a loss function.

<Operation of Learning Apparatus>
[Learning Processing]

Figure 5:
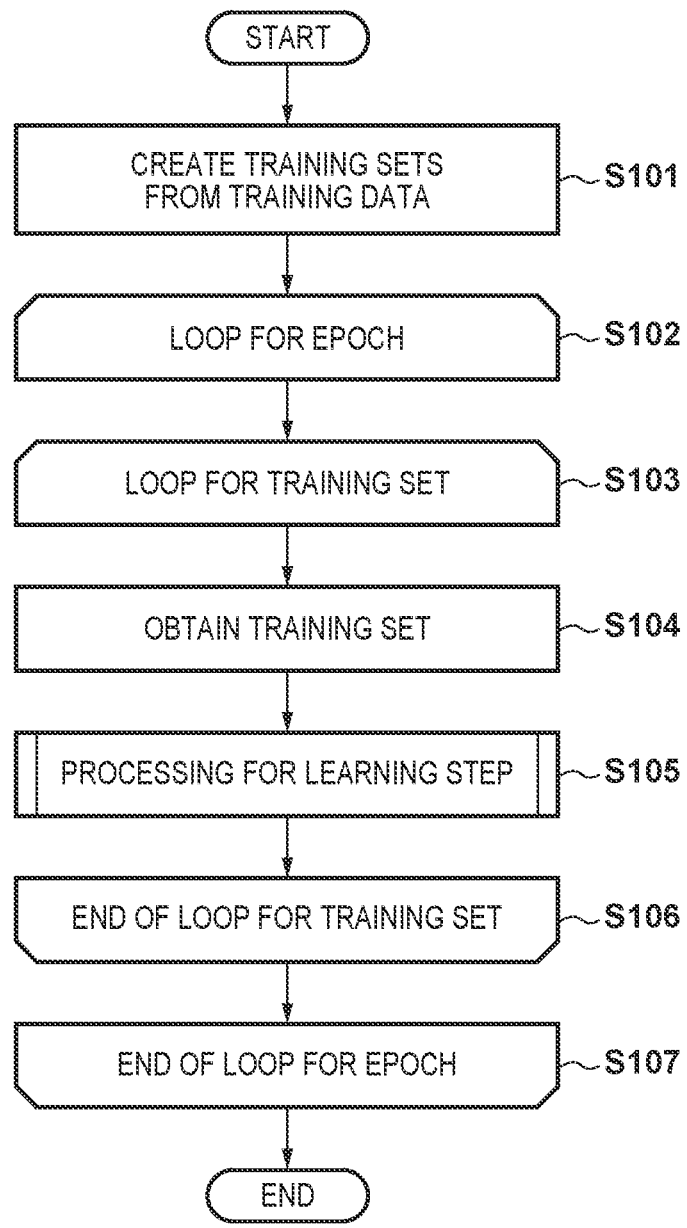
FIG. 5 is a flowchart for explaining learning processing in the first embodiment.

FIG. 5 is a flowchart for explaining learning processing in the first embodiment.

In step S101, the training set creation unit 202 creates a Positive set, a Negative set, and a Pseudo set as training sets from image data included in the training data held by the training data holding unit 201.

Step S102 is the start of a loop for an epoch. Using all the training sets created in step S101 for one loop of learning processing is called one epoch. The number of epochs to be repeated is predetermined. A variable i is used for counting the number of repetitions of an epoch, and it is first initialized to i=1. Then, when i is a predetermined number or less of epochs, the processing transitions to step S103, and when i exceeds the predetermined number of epochs, the processing exits the loop and ends.

Step S103 is the start of a loop for a training set. Assume that the training sets created in step S101 are assigned numbers in order from 1. Since they are referenced using a variable j, the variable j is first initialized to j=1. When j is the number or less of training sets, the processing transitions to step S104, and when j exceeds the number of training sets, the processing exits the loop and transitions to step S107.

In step S104, the training set obtaining unit 203 obtains one training set from the training sets created in step S101. Further, a configuration may be taken so as to perform image data processing and the like, such as the above-described data augmentation, on image data included in the obtained training set and set the result as a training set. Then, in step S105, the learning apparatus performs learning using the obtained data. Details of this processing will be described later with reference to FIG. 6.

Step S106 is the end of the loop for a training set; the variable j is increased (incremented) by 1, and the processing returns to step S103. In addition, step S107 is the end of the loop for an epoch; the variable i is increased by 1, and the processing returns to step S102.

[Processing for Learning Step]

Figure 6:
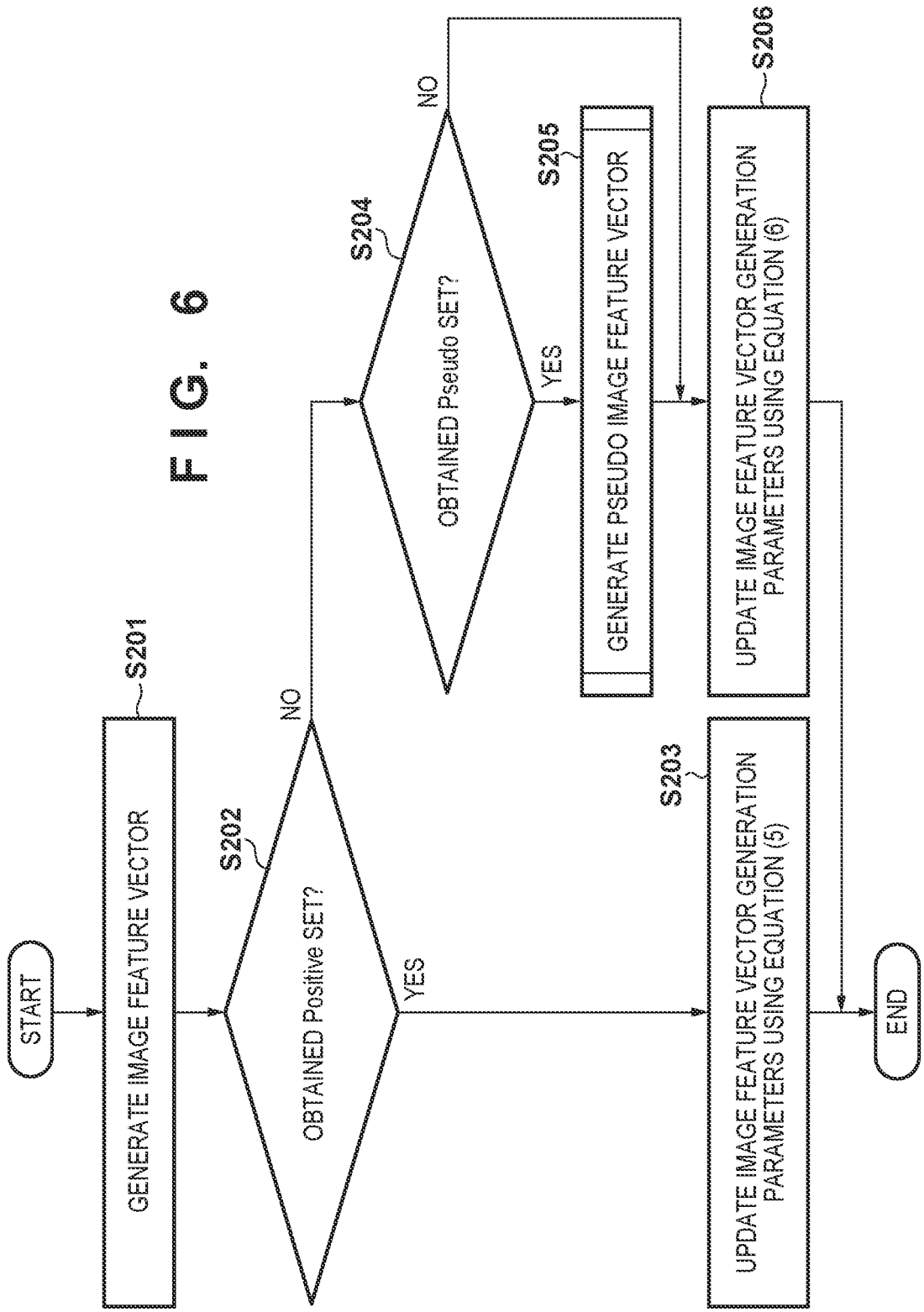
FIG. 6 is a detailed flowchart for processing for a learning step (step S105).

FIG. 6 is a detailed flowchart for processing for a learning step (step S105). The following processing is executed by the units 204 to 211 included in the learning apparatus of FIG. 2.

In step S201, the learning apparatus generates an image feature vector by forward processing of a neural network taking a facial image included in the obtained training set as input.

In step S202, the learning apparatus determines whether or not the obtained training set is a Positive set. If it is a Positive set, the processing transitions to step S203; otherwise, the processing transitions to step S204.

In step S203, the learning apparatus updates generation parameters, which control generation of an image feature vector, using Equation (5) so as to reduce a Euclidean distance between two image feature vectors.

In step S204, the learning apparatus determines whether or not the obtained training set is a Pseudo set. If it is a Pseudo set, the processing transitions to step S205; otherwise, the processing transitions to step S206.

In step S205, the learning apparatus generates a pseudo image feature vector. Specifically, a description will be given with reference to FIG. 7. FIG. 7 is a detailed flowchart for generation of a pseudo image feature vector (step S205).

In step S301, the learning apparatus obtains a first vector group and a second vector group. Specifically, image feature vectors generated from facial images included in a first group of a Pseudo set are obtained as the first vector group. In addition, image feature vectors generated from facial images included in a second group of a Pseudo set are obtained as the second vector group.

In step S302, the learning apparatus calculates a projection destination vector from the first vector group and a projection source vector from the second vector group. In step S303, the learning apparatus calculates the transformation matrix A satisfying Equation (1) with respect to the projection destination vector $u_X$ and the projection source vector $u_Y$. In step S304, the learning apparatus generates a pseudo image feature vector by transforming an arbitrary vector included in the second vector group using the transformation matrix A on.

In step S206, the learning apparatus updates parameters, which controls generation of an image feature vector, using Equation (6) so as to increase a Euclidean distance between two image feature vectors.

By the above learning processing, a parameter for controlling generation of an image feature vector is updated based on a pseudo image feature vector generated from an image feature vector.

<Functional Configuration of Inference Apparatus>

Figure 3:
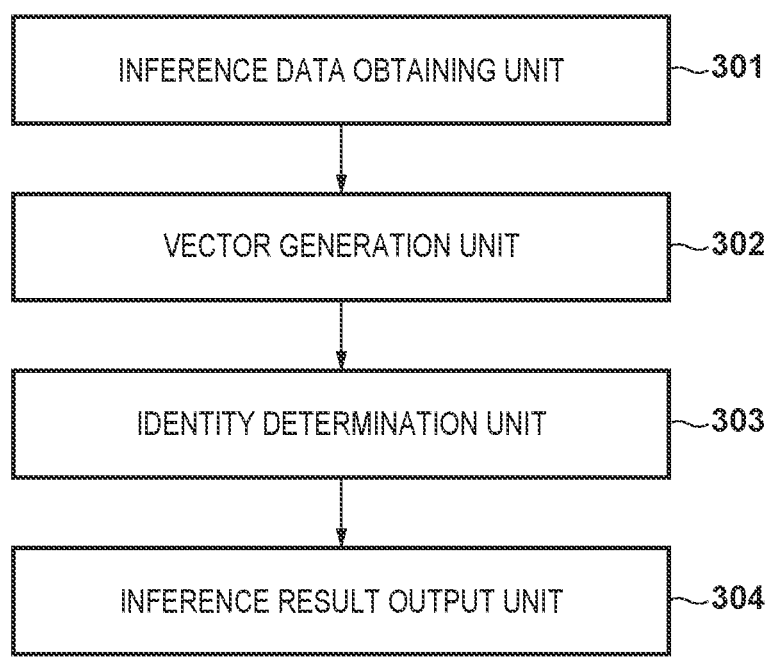
FIG. 3 is a diagram illustrating a functional configuration of an inference apparatus according to the first embodiment.

FIG. 3 is a diagram illustrating a functional configuration of the inference apparatus according to the first embodiment. Specifically, it illustrates a configuration of the inference apparatus that performs inference for a main task using a neural network trained by the learning apparatus described above. In the present embodiment, the main task is face authentication; therefore, determination of whether or not two facial images are of the same person is performed as inference processing.

An inference data obtaining unit 301 obtains two facial images. Here, assume a system that performs identity verification using a facial image obtained by a camera at the time a user performs authentication by inputting a login ID and password from a keyboard and the like.

Specifically, a login screen is displayed on the monitor 110, and input of the login ID and password is received from the user via the input device 109. The login ID, password, and facial image are held in advance in the external storage apparatus 104, and when the login ID and password inputted by the user correspond, a corresponding first facial image is obtained from the external storage apparatus 104. Meanwhile, an instruction is displayed on the monitor 110 prompting the user to look at the NW camera 112, and a second facial image is obtained by capturing the user via the NW camera 112. The method for obtaining two facial images and the method for configuring the system are not limited to these.

A vector generation unit 302 is the same as the vector generation unit 204 of the learning apparatus 200. It holds weights and the like for a neural network trained by the learning apparatus 200 and generates an image feature vector representing features of a facial image.

An identity determination unit 303 obtains a similarity between the two facial images. In addition, it is determined whether or not the user is the person based on the similarity. Specifically, the similarity of image feature vectors of the two facial images obtained from the vector generation unit 302 is calculated. When the similarity exceeds a threshold held in advance, it is determined that the user is the person.

An inference result output unit 304 outputs an inference result obtained by the identity determination unit 303. Specifically, it is outputted to the monitor 110 as a result of login determination. For example, when it is determined that the user is the person, it is displayed that the login succeeded. If it is not determined that the user is the person, it is displayed that the login failed. Furthermore, a result of identity determination may be recorded in the external storage apparatus 104. When a predetermined number or more of failures are recorded, a notification to an administrator user of a possibility of unauthorized access may be performed. The method for outputting an inference result is not limited to these.

<Operation of Inference Apparatus>

[Inference Processing]

FIG. 8 is a flowchart for explaining inference processing in the first embodiment. The following processing is executed by the units 301 to 304 included in the inference apparatus of FIG. 3.

In step S401, the inference apparatus obtains two facial images to be targets of face authentication via the inference data obtaining unit 301. In step S402, the inference apparatus obtains image feature vectors of the two facial images obtained in step S401. In step S403, the inference apparatus performs identity determination using the two image feature vectors obtained in step S402. Specifically, a Euclidean distance of the two image feature vectors is obtained as a similarity. When the obtained similarity exceeds a threshold held in advance, it is determined that the user is the person. If it is the threshold or below, it is determined that the user is not the person (another person).

In step S404, the inference apparatus outputs a determination result of step S403 to the monitor 110 or the external storage apparatus 104 by the inference result output unit 304. The determination result is thus transmitted to the user or recorded.

<Effects>

As described above, according to the first embodiment, facial images of persons whose faces are similar (same attribute, etc.) are grouped, and a pseudo image feature vector is generated from an image feature vector group generated from the grouped facial images. The pseudo image feature vector thus generated becomes a vector corresponding to another person similar to persons included in the group. Accordingly, performing learning so as to achieve identification of a similar but different person brings improvement in image feature vector representation ability, which also leads to improvement in the accuracy of face authentication. Further, even when there is a bias in category distribution of data included in training data held by the training data holding unit 201, it is possible to provide a data set of image feature vectors whose category distribution is of a desired ratio (for example, a realistic ratio).

Second Embodiment

A description is given below using a learning apparatus of another embodiment as an example of a second embodiment of the information processing apparatus according to the present invention. A functional configuration and hardware configuration of an inference apparatus are the same as that of the first embodiment, and thus description thereof will be omitted. Therefore, in the following, the learning apparatus will be described with reference to FIGS. 9 to 12.

<Functional Configuration of Learning Apparatus>

The learning apparatus of the present embodiment trains a machine learning model for face authentication by a "representative vector method" known in Document 3 "Deng, et. al, 'ArcFace: Additive Angular Margin Loss for Deep Face Recognition'. In CVPR, 2019". The representative vector method is a learning method for face authentication in which learning efficiency is increased by setting and using feature amount vectors corresponding to respective persons included in training data.

When the number of persons included in training data to be used is n, a representative vector is a vector configured by a fully connected layer $W \in R^{d \times n}$ adjacent to an output layer of a learning model and a representative vector $W_j \in R^d$ corresponds to a j-th person ID. A person ID is ID information that is the same for the same person. d is the number of dimensions of a representative vector. An image feature vector generated using a CNN from a facial image of an i-th person ID is set to $x_i \in R^d$. Parameters configuring a learning model are updated based on an inter-vector distance $\theta_{x_i w_j}$ obtained from a cosine similarity between an image feature vector $x_i$ and a representative vector $W_j$ shown in Equation (7). More specifically, the parameters are updated so as to reduce $\theta_{x_i w_i}$ for a representative vector and an image feature vector of the same person ID. Meanwhile, the parameters are updated so as to increase $$\sum_{j=1, j \neq i}^{n} \theta_{x_i w_j}$$

for a representative vector and an image feature vector of different person IDs.

$$\cos \theta_{x_i w_j} = \frac{x_i W_j}{\|x_i\| \|W_j\|} \quad (7)$$

By performing the above learning, it becomes possible to consider the representative vector $W_j$ as a vector representing a j-th person ID in a feature space formed by a learning model.

In the present embodiment, conversion to a representative vector representing a person included in training data is performed. By this, a pseudo representative vector group $W' \in R^{d \times n'}$ representing a new person not included in training data is generated, and a fully connected layer W is replaced with $\{W, W'\} \in R^{d \times (n+n')}$ and applied to learning.

Figure 9:
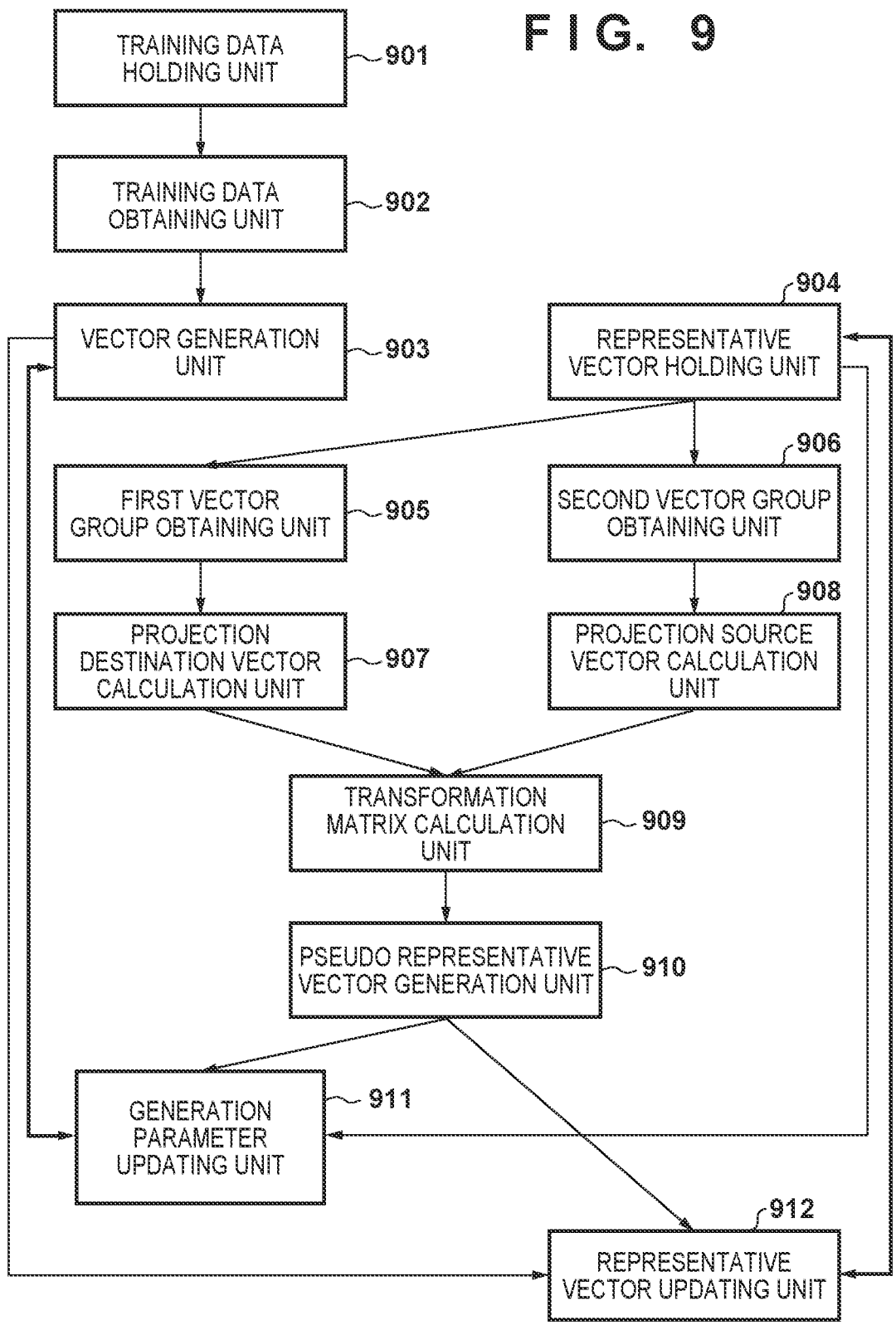
FIG. 9 is a diagram illustrating a functional configuration of a learning apparatus according to a second embodiment.

FIG. 9 is a diagram illustrating a functional configuration of the learning apparatus according to the second embodiment. The basic configuration is similar to that of the first embodiment (FIG. 2); however, there are some differences. Specifically, a training data obtaining unit 902 is provided in place of the training set creation unit 202 and the training set obtaining unit 203. A pseudo representative vector generation unit 910 is provided in place of the pseudo vector generation unit 210. Functions of a first vector group obtaining unit 905, a second vector group obtaining unit 906, and a generation parameter updating unit 911 are changed, and a representative vector holding unit 904 and a representative vector updating unit 912 are newly provided.

The training data obtaining unit 902 obtains a "facial image" and a "person ID" to be used for learning from a training data holding unit 901. The training data obtaining unit 902 may perform data processing known as data augmentation and the like. For example, processing, such as changing a tone of a facial image and including noise in a pixel value, is performed. The data processing is not limited to these. The representative vector holding unit 904 holds representative vectors representing respective persons included in training data.

The first vector group obtaining unit 905 obtains some representative vectors from the representative vector holding unit 904 based on a person ID obtained by the training data obtaining unit 902. Specifically, it obtains a "representative vector corresponding to a person of the person ID" and a "representative vector corresponding to a person whose face is similar to that of the person of the person ID". The person whose face is similar to the person of the person ID is determined, for example, by selecting a person corresponding to a representative vector close in an inter-vector distance to the representative vector corresponding to the person of the person ID. In addition, determination may be performed by giving an attribute label to each person in advance and selecting a person of the same attribute. The attribute label may be race, gender, or a label combining race and gender. However, the selection method and the attribute label to be used for selection are not limited to these.

The second vector group obtaining unit 906 obtains some representative vectors from the representative vector holding unit 904 based on a person ID obtained by the training data obtaining unit 902. Specifically, it obtains a "representative vector corresponding to an arbitrarily-selected person different from a person of the person ID" and a "representative vector corresponding to a person whose face is similar to that of the arbitrarily-selected person". The selection of the person whose face is similar may be the same as in the case of the first vector group obtaining unit 905 described above.

The pseudo representative vector generation unit 910 generates a pseudo representative vector and sets it as a representative vector corresponding to a new person. More specifically, a pseudo representative vector is generated by converting a vector arbitrarily selected from a vector group obtained by the second vector group obtaining unit 906 using a transformation matrix calculated by a transformation matrix calculation unit 909.

The generation parameter updating unit 911 updates generation parameters. Specifically, update is performed based on an image feature vector generated from a facial image obtained by the training data obtaining unit 902, a representative vector stored in the representative vector holding unit 904, and a pseudo representative vector generated by the pseudo representative vector generation unit 910. At this time, generation parameters are updated so as to make an image feature vector generated from a facial image closer to a representative vector corresponding to a person of an obtained person ID. Further, the generation parameters are updated so as to make an image feature vector generated from a facial image farther from a representative vector corresponding to a person other than the person of the obtained person ID and a pseudo representative vector generated by the pseudo representative vector generation unit 910.

As an updating method, there is a method of updating parameters using a loss function L shown in Equation (8) by applying a loss function, such as ArcFace, for example. Details of ArcFace are described in the above-described Document 3.

$$L = -\frac{1}{N}\sum_{i=1}^{N}\log\frac{e^{s\cos(\theta_{x_i W_i}+m)}}{e^{s\cos(\theta_{x_i W_i}+m)} + \sum_{j=1, j\neq i}^{n} e^{s\cos\theta_{x_i W_j}} + \sum_{j=1}^{n'} e^{s\cos\theta_{x_i W'_j}}} \quad (8)$$

N is a batch size, and s and m are hyperparameters. By adding m to $\theta_{x_i}w_i$, it is considered that the user is not the person unless the image feature vector $x_i$ is positioned m or more closer to a representative vector $W_i$ than to the other representative vectors. That is, it is possible to make learning less difficult.

The representative vector updating unit 912 updates the representative vector. Specifically, the representative vector corresponding to the person of the person ID obtained by the training data obtaining unit 902 is updated so as to make the representative vector closer to the image feature vector generated from the facial image obtained by the training data obtaining unit 902. In addition, a representative vector corresponding to a person other than the person of the person ID obtained by the training data obtaining unit 902 is updated so as to make the representative vector farther from the image feature vector generated from the facial image obtained by the training data obtaining unit 902.

Regarding an updating method, similarly to the generation parameter updating unit 911 described above, for example, parameters are updated using the loss function L shown in Equation (8) by applying a loss function, such as ArcFace. The updating methods and loss functions to be used are not limited to these.

<Operation of Learning Apparatus>
[Learning Processing]

Figure 10:
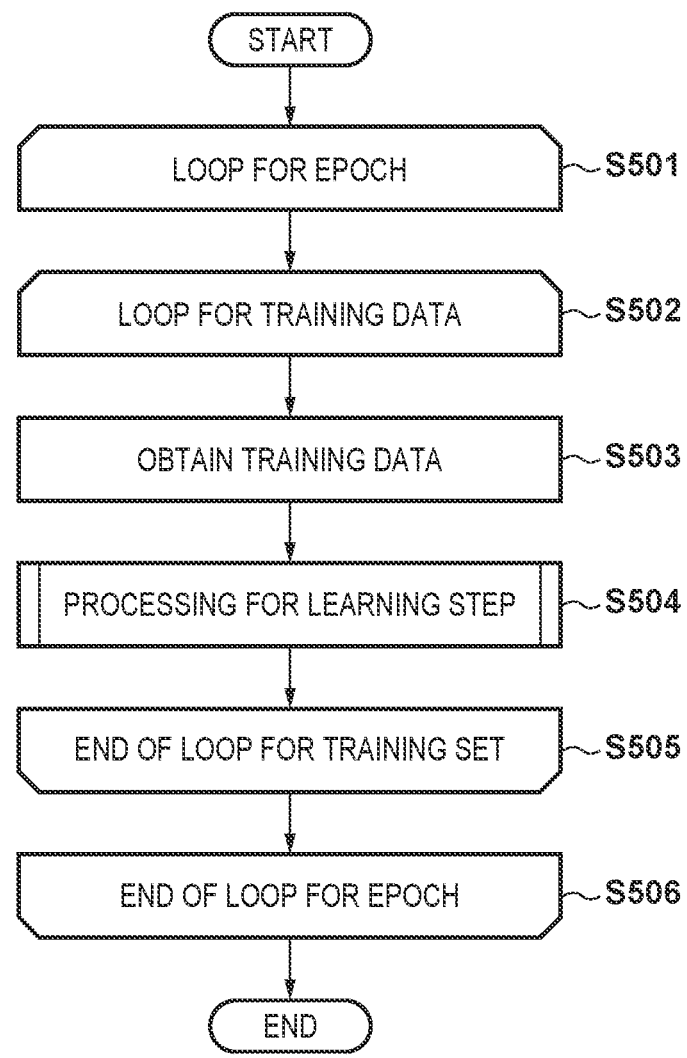
FIG. 10 is a flowchart for explaining learning processing in the second embodiment.

FIG. 10 is a flowchart for explaining learning processing in the second embodiment.

Step S501 is the start of a loop for an epoch. The number of epochs to be repeated is predetermined. A variable i is used for counting the number of repetitions of an epoch, and it is first initialized to i=1. Then, when i is a predetermined number or less of epochs, the processing transitions to step S502, and when i exceeds the predetermined number of epochs, the processing exits the loop and ends.

Step S502 is the start of a loop for training data. Assume that training data is assigned numbers in order from 1. Since it is referenced using a variable j, the variable j is first initialized to j=1. When j is the number or less of training data, the processing transitions to step S503, and when j exceeds the number of training data, the processing exits the loop and transitions to step S506.

In step S503, the training data obtaining unit 902 obtains training data. Further, a configuration may be taken so as to perform image data processing and the like, such as the above-described data augmentation, on image data included in the obtained training data and set the result as training data. Then, in step S504, the learning apparatus performs learning using the obtained set. Details of this processing will be described later with reference to FIG. 11.

Step S505 is the end of the loop for training data; the variable j is increased (incremented) by 1, and the processing returns to step S502. In addition, step S506 is the end of the loop for an epoch; the variable i is increased by 1, and the processing returns to step S501.

[Processing for Learning Step]

Figure 11:
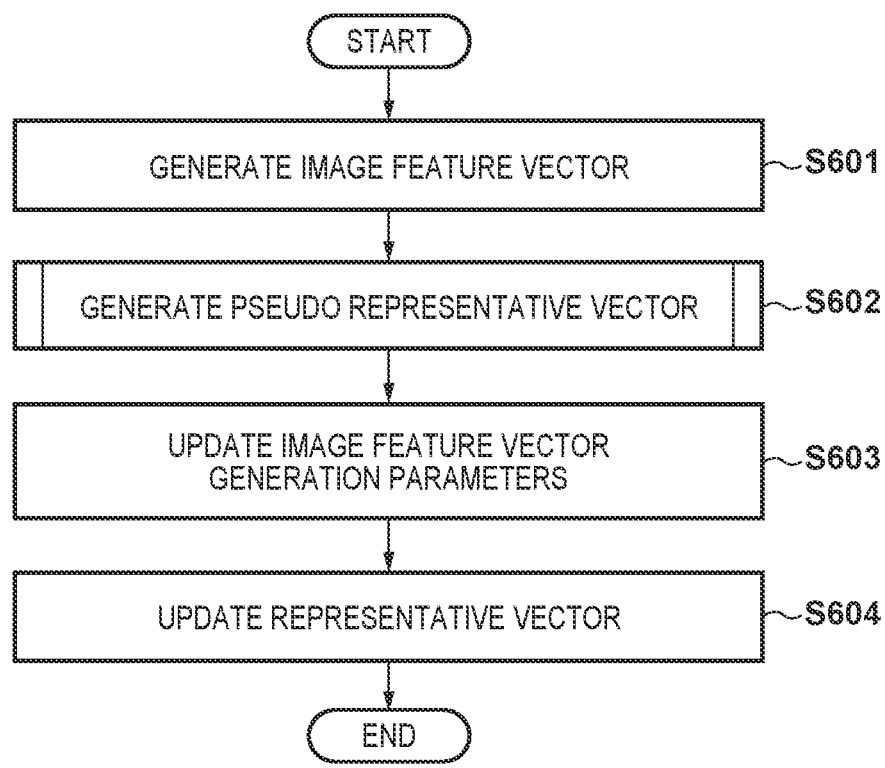
FIG. 11 is a detailed flowchart for processing for a learning step (step S504).

FIG. 11 is a detailed flowchart for processing for a learning step (step S504). The following processing is executed by the units 903 to 912 included in the learning apparatus of FIG. 9.

In step S601, the learning apparatus generates an image feature vector by forward processing of a neural network taking a facial image included in the obtained training data as input.

Figure 12:
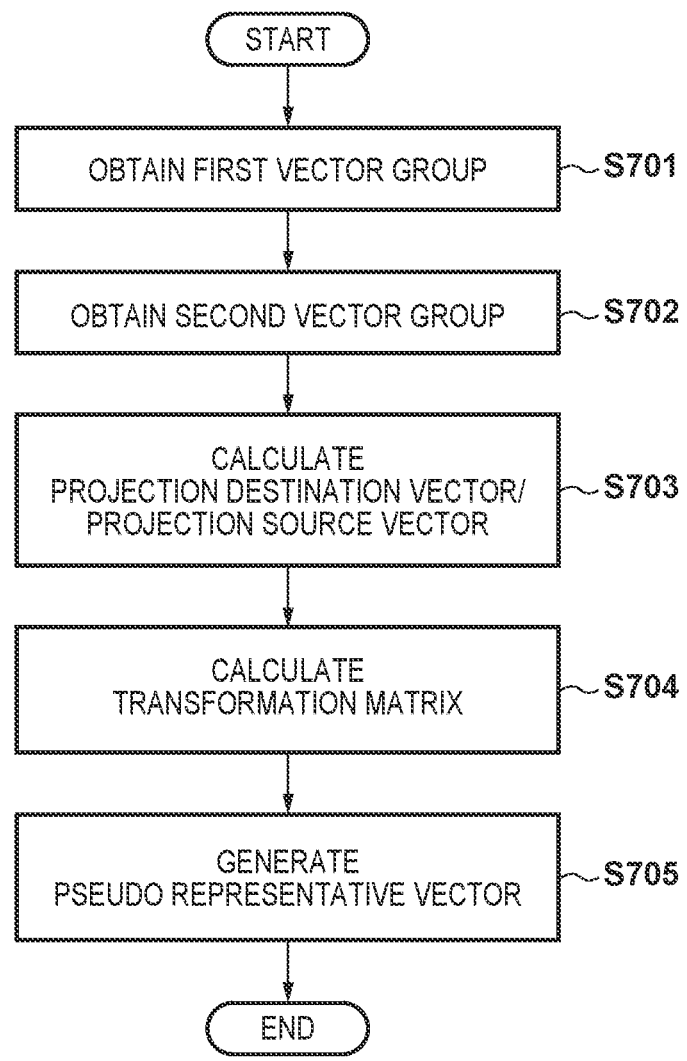
FIG. 12 is a detailed flowchart for generation of a pseudo representative vector (step S602).

In step S602, the learning apparatus generates a pseudo image feature vector. Specifically, a description will be given with reference to FIG. 12. FIG. 12 is a detailed flowchart for generation of a pseudo representative vector (step S602).

In step S701, the learning apparatus obtains a first vector group based on a person ID (person A) obtained in step S503. Specifically, a "representative vector corresponding to the person ID (person A)" and a "representative vector corresponding to a person ID of one or more persons similar to the person A" are obtained as the first vector group.

In step S702, the learning apparatus obtains a second vector group based on an arbitrary person ID (person B) not obtained in step S503. Specifically, a "representative vector corresponding to the person ID (person B)" and a "representative vector corresponding to a person ID of one or more persons similar to the person B" are obtained as the second vector group.

In step S703, the learning apparatus calculates a projection destination vector and a projection source vector. In step S704, the learning apparatus calculates a transformation matrix satisfying Equation (1). In step S705, the learning apparatus generates a pseudo representative vector based on the transformation matrix.

In step S603, the learning apparatus updates generation parameters, which control generation of an image feature vector, using Equation (8). Further, in step S604, the learning apparatus updates the representative vector using Equation (8).

<Effects>

As described above, according to the second embodiment, a pseudo image feature vector described in the first embodiment is applied to learning by the <representative vector method> for which a high authentication accuracy has been reported in machine learning for face authentication. Using an updated representative vector leads to further improvement in the accuracy of face authentication in an inference apparatus.

Third Embodiment

A description is given below using a learning apparatus of another embodiment as an example of a third embodiment of the information processing apparatus according to the present invention. A functional configuration and hardware configuration of an inference apparatus are the same as that of the first embodiment, and thus description thereof will be omitted. Therefore, in the following, the learning apparatus will be described with reference to FIGS. 13 to 16.

<Functional Configuration of Learning Apparatus>

The learning apparatus of the present embodiment trains a machine learning model for face authentication by the "representative vector method" in the same manner as in the second embodiment. However, in contract to the second embodiment in which each time training data is obtained, a pseudo representative vector is generated, in the third embodiment a pseudo representative vector is generated in advance and the pseudo representative vector generated in advance is used as an initial value in learning.

The pseudo representative vector is generated as a representative vector representing another person similar to a person included in training data. However, if a feature space changes by progress in learning, that other person will no longer be similar. Therefore, in order to maintain a similarity state even when the feature space changes, in the present embodiment a pseudo representative vector is updated every time training data is obtained.

Figure 13:
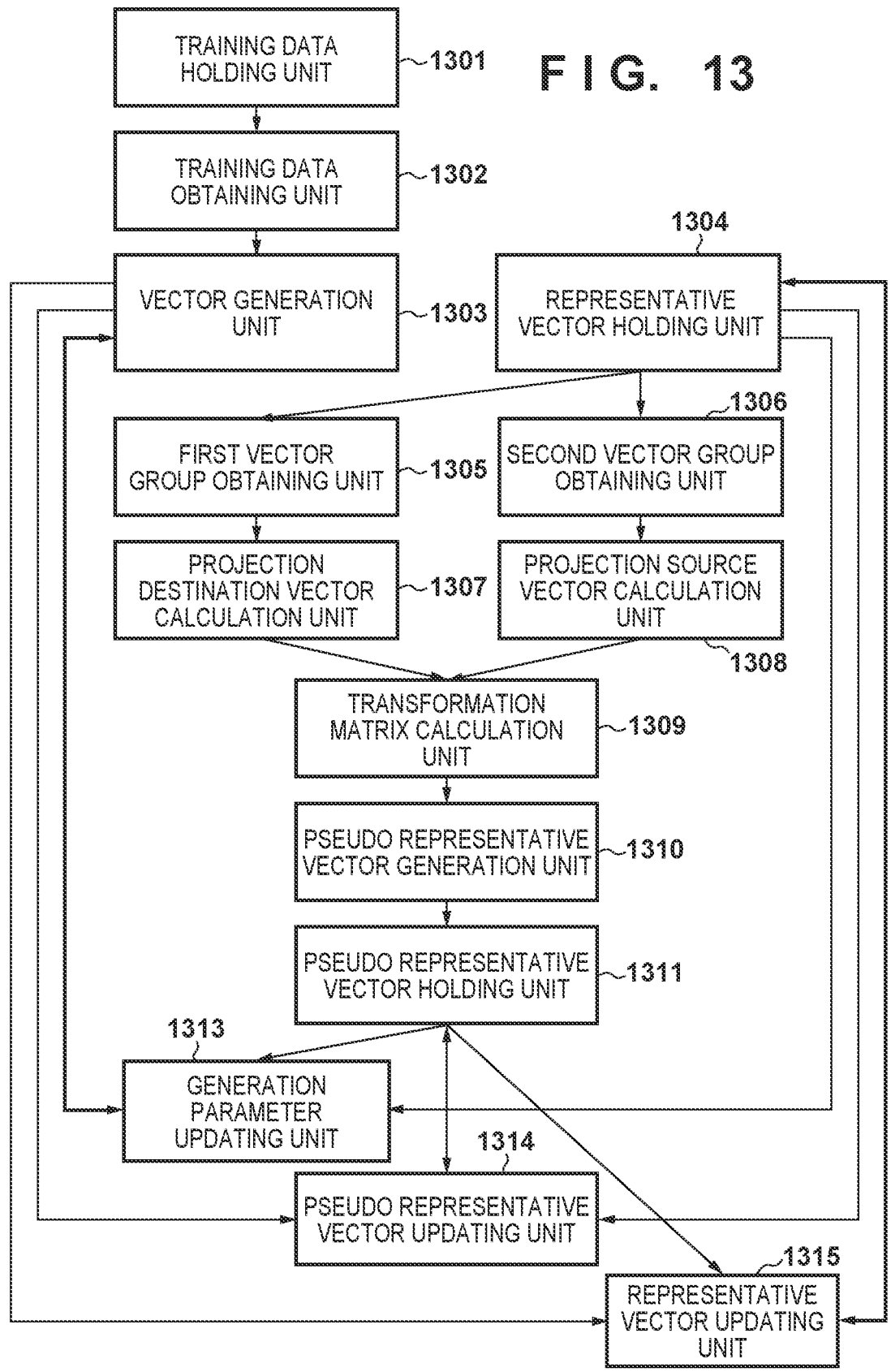
FIG. 13 is a diagram illustrating a functional configuration of a learning apparatus according to a third embodiment.

FIG. 13 is a diagram illustrating a functional configuration of the learning apparatus according to the third embodiment. The basic configuration is similar to that of the second embodiment (FIG. 9); however, there are some differences. Specifically, a representative vector holding unit 1304 and a pseudo representative vector updating unit 1314 are provided.

A pseudo representative vector holding unit 1311 holds a pseudo representative vector generated in advance by a pseudo representative vector generation unit 1310.

The pseudo representative vector updating unit 1314 updates a pseudo representative vector to "maintain a state of similarity to a person" with respect to that person included in training data. Specifically, one or more pseudo representative vectors distributed in a vicinity within a predetermined inter-vector distance from an image feature vector generated from a facial image are updated so as to come closer to the image feature vector while maintaining a fixed distance.

When performing an update such that K pseudo representative vectors distributed in a vicinity of the image feature vector $x_i$ come closer while maintaining a fixed distance, parameters are updated using a loss function L shown in Equation (9) by applying a loss function, such as ArcFace.

$$L = -\frac{1}{N \times K} \sum_{i=1}^{N} \sum_{k=1}^{K} \log \frac{\exp\left(s \times \cos\left(\theta_{x_i W'_{F(W', x_i, k)}} - m\right)\right)}{\sum_{j=1}^{n} \exp(s \times \cos\theta_{x_i W_j}) + \sum_{j=1}^{n'} \exp(s \times \cos(\theta_{x_i W'_j} - m))} \quad (9)$$

N is a batch size, and s and m are hyperparameters. A function F(W', xi, k) is a function that returns j of a k-th nearest neighbor pseudo representative vector Wj' from a pseudo representative vector group W' for the image feature vector xi. The above neighbor is determined in the inter-vector distance $\theta_{x_i w_j}$ obtained from a cosine similarity of an image feature vector and a pseudo representative vector shown in Equation (9). By subtracting a fixed value m from an inter-vector distance between an image feature vector and a pseudo representative vector, an effect of a loss function is weakened, which makes it possible to maintain a fixed interval. The updating method and loss function to be used are not limited to these.

<Operation of Apparatus>

[Learning Processing]

Figure 14:
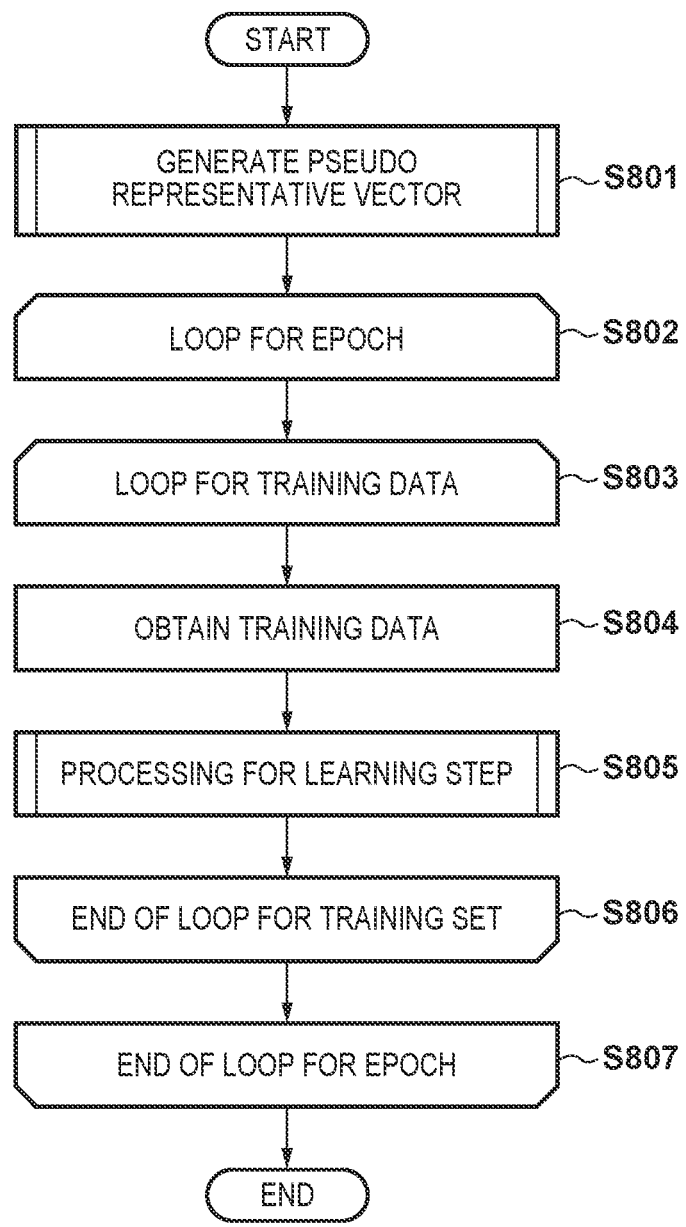
FIG. 14 is a flowchart for explaining learning processing in the third embodiment.

FIG. 14 is a flowchart for explaining learning processing in the third embodiment.

In step S801, the learning apparatus generates a pseudo representative vector. Specifically, a description will be given later with reference to FIG. 15.

Step S802 is the start of a loop for an epoch. The number of epochs to be repeated is predetermined. A variable i is used for counting the number of repetitions of an epoch, and it is first initialized to i=1. Then, when i is a predetermined number or less of epochs, the processing transitions to step S803, and when i exceeds the predetermined number of epochs, the processing exits the loop and ends.

Step S803 is the start of a loop for training data. Assume that training data is assigned numbers in order from 1. Since it is referenced using a variable j, the variable j is first initialized to j=1. When j is the number of training data or less, the processing transitions to step S804, and w % ben j exceeds the number of training data, the processing exits the loop and transitions to step S807.

In step S804, a training data obtaining unit 1302 obtains training data. Further, a configuration may be taken so as to perform image data processing and the like, such as the above-described data augmentation, on image data included in the obtained training data and set the result as training data. Then, in step S805, the learning apparatus performs learning using the obtained data. Details of this processing will be described later with reference to FIG. 16.

Step S806 is the end of the loop for training data; the variable j is increased (incremented) by 1, and the processing returns to step S803. In addition, step S807 is the end of the loop for an epoch; the variable i is increased by 1, and the processing returns to step S802.

[Processing for Generating Pseudo Representative Vector]

Figure 15:
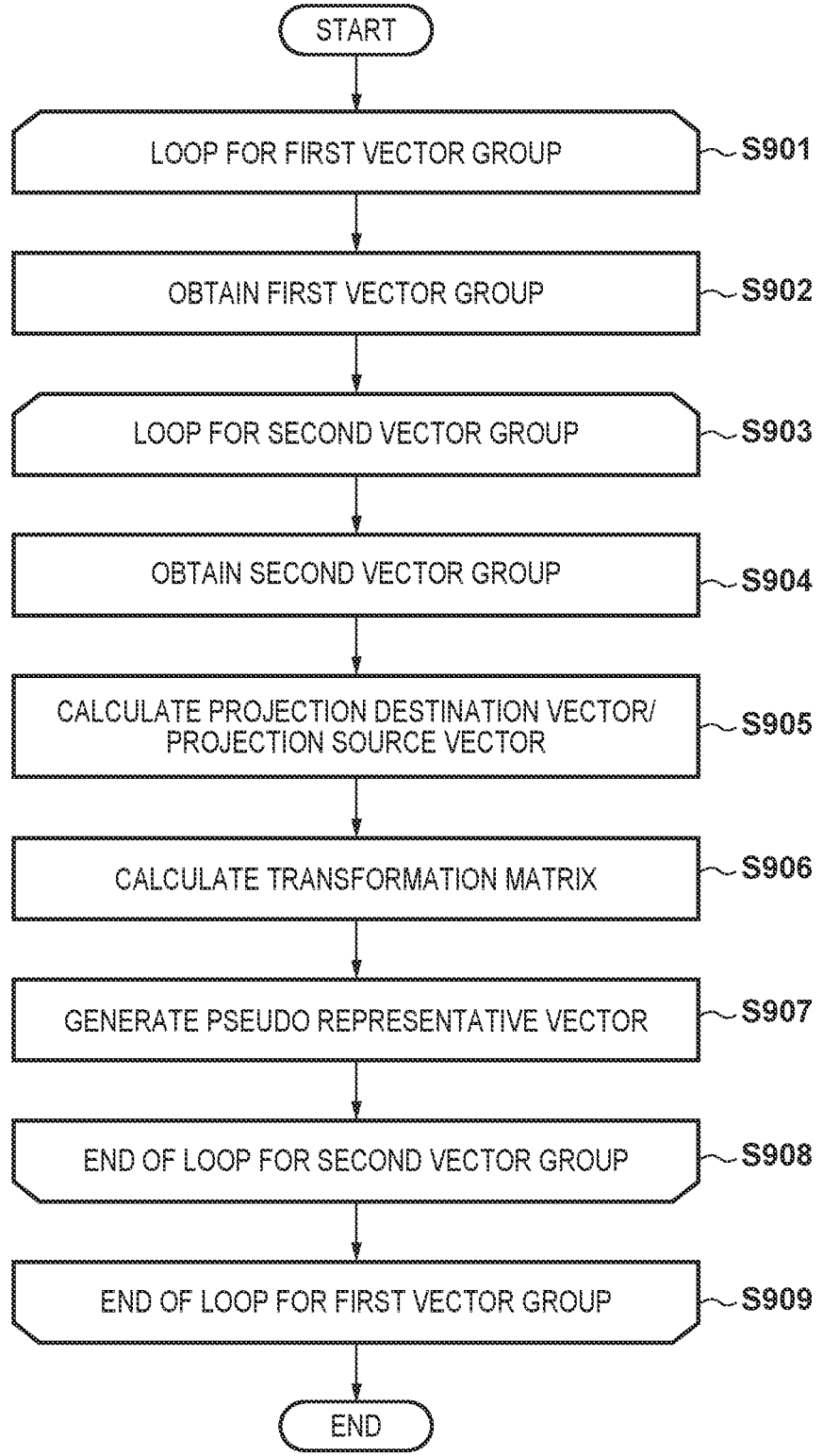
FIG. 15 is a detailed flowchart for generation of a pseudo representative vector (step S801).

FIG. 15 is a detailed flowchart for generation of a pseudo representative vector (step S801). The following processing is executed by the units 1302 to 1310 included in the learning apparatus of FIG. 13.

Step S901 is the start of a loop for obtainment of a first vector group. Assume that a representative vector held by a vector holding unit 1304 is assigned numbers in order from 1. Since they are referenced using a variable k, the variable k is first initialized to k=1. When k is the total number or less of representative vectors, the processing transitions to step S902, and when it exceeds the total number, the processing exits the loop and ends.

In step S902, the learning apparatus obtains a first vector group. Specifically, a "representative vector assigned to the variable k" and a "representative vector corresponding to one or more persons considered to be similar to a person to whom the representative vector assigned to the variable k corresponds" are obtained.

Step S903 is the start of a loop for obtainment of a second vector group. The number of obtainments to be repeated is determined in advance. A variable 1 is used for counting the number of repetitions of obtainment, and it is first initialized to l=1. When it is the predetermined number or less of obtainments, the processing transitions to step S904, and when it exceeds the predetermined number of obtainments, the processing exits the loop and transitions to step S909.

In step S904, the learning apparatus obtains a second vector group. Specifically, "any one representative vector other than the representative vector assigned to the variable k" and a "representative vector corresponding to one or more persons considered to be similar to a person to whom that representative vector corresponds" are obtained.

In step S905, the learning apparatus calculates a projection destination vector from the first vector group obtained in step S902 and a projection source vector from the second vector group obtained in step S904.

In step S906, the learning apparatus calculates the transformation matrix A satisfying Equation (1) with respect to the projection destination vector $u_X$ and the projection source vector $u_Y$. In step S907, the learning apparatus generates a pseudo representative vector by transforming an arbitrary vector included in the second vector group using the transformation matrix A.

Step S908 is the end of the loop for obtainment of a second vector group; the variable l is increased by 1, and the processing returns to step S903. Step S909 is the end of the loop for obtainment of a first vector group; the variable k is increased by 1, and the processing returns to step S901.

[Processing for Learning Step]

Figure 16:
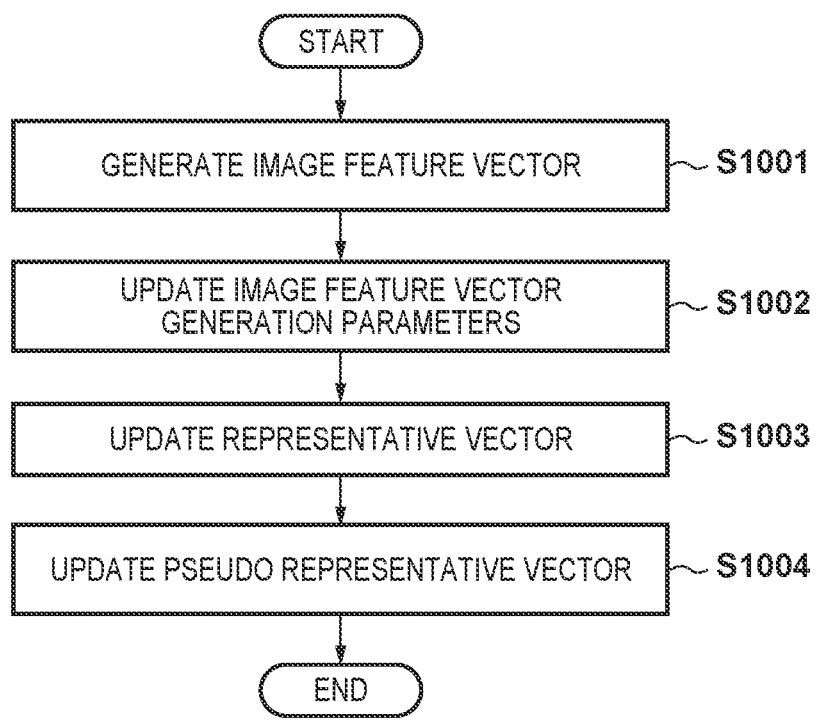
FIG. 16 is a detailed flowchart for processing for a learning step (step S805).

FIG. 16 is a detailed flowchart for processing for a learning step (step S805). The following processing is executed by the units 1303 to 1315 included in the learning apparatus of FIG. 13.

In step S1001, the learning apparatus generates an image feature vector by forward processing of a neural network taking a facial image included in the obtained training data as input.

In step S1002, the learning apparatus updates generation parameters, which control generation of an image feature vector, using Equation (8). In step S1003, the learning apparatus updates a representative vector using Equation (8). In step S1004, the learning apparatus updates a pseudo representative vector using Equation (9).

<Effects>

As described above, according to the third embodiment, similarly to the second embodiment, a pseudo image feature vector is applied to learning by the <representative vector method>. Meanwhile, unlike the second embodiment, the pseudo representative vector is generated in advance, and the pseudo representative vector is not generated at the time of learning. Therefore, as compared with learning in the second embodiment, it is possible to reduce the processing time spent for learning.

Fourth Embodiment

A description is given below using a learning apparatus of another embodiment as an example of a fourth embodiment of the information processing apparatus according to the present invention. A functional configuration and hardware configuration of an inference apparatus are the same as that of the first embodiment, and thus description thereof will be omitted. Therefore, in the following, the learning apparatus will be described with reference to FIGS. 17 to 19.

<Functional Configuration of Learning Apparatus>

The learning apparatus of the present embodiment trains a machine learning model for face authentication. In the present embodiment, similarly to the first embodiment, a pseudo image feature vector representing a facial image of a new person not included in training data is generated and then applied to learning. This aims to improve the accuracy of facial authentication.

In the first embodiment, it is determined whether or not a person is similar based on an attribute label assigned to the person. However, there are case where a person is not be treated as a similar person in a feature space despite being of the same attribute, in which case it is impossible to select an appropriate person. Therefore, in the fourth embodiment, whether an inter-vector distance between image feature vectors is short is used as a criterion for determining whether or not they are similar.

Figure 17:
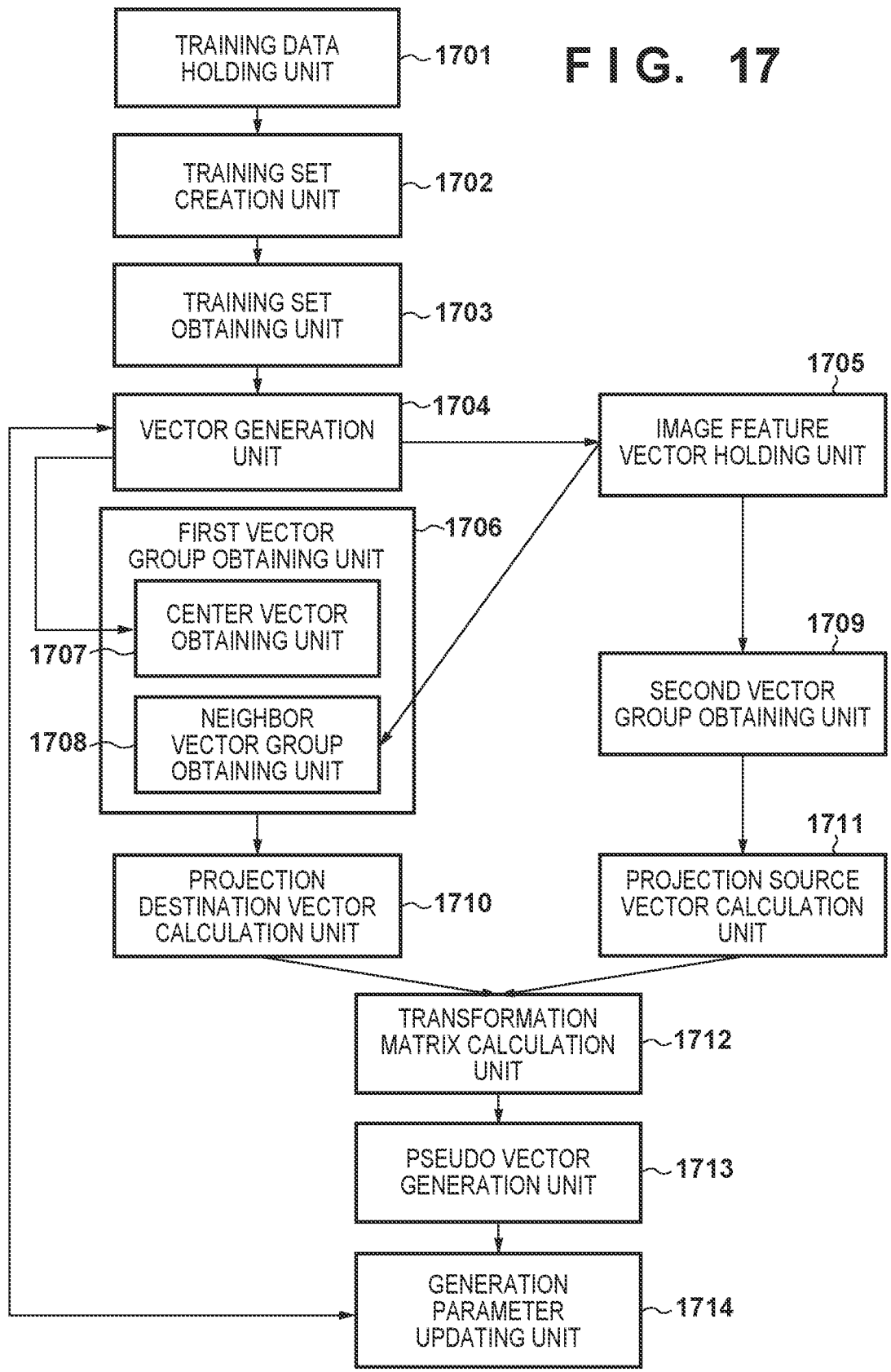
FIG. 17 is a diagram illustrating a functional configuration of a learning apparatus according to a fourth embodiment.

FIG. 17 is a diagram illustrating a functional configuration of the learning apparatus according to the fourth embodiment. The basic configuration is similar to that of the first embodiment (FIG. 2); however, there are some differences. Specifically, functions of a training set creation unit 1702, a first vector group obtaining unit 1706, and a second vector group obtaining unit 1709 are changed. Further, an image feature vector holding unit 1705, a center vector obtaining unit 1707, and a neighbor vector group obtaining unit 1708 are added.

The training set creation unit 1702 extracts a plurality of image data held in a training data holding unit 1701 and creates training sets. There are three patterns of training sets, a Positive set, a Negative set and a Pseudo set. FIG. 18 is a diagram for explaining training sets created by processing for creating a training set.

A Positive set 1801 is configured by two facial images of the same person. In the present embodiment, a plurality of Positive sets are created by all possible combinations of facial images held in the training data holding unit 1701. A Negative set 1802 is configured by two facial images of different persons. In the present embodiment, a plurality of Negative sets are created by all possible combinations of facial images held in the training data holding unit 1701. A Pseudo set 1803 is configured by one facial image of any one person. A plurality of Pseudo sets are created.

The image feature vector holding unit 1705 holds an image feature vector generated by a vector generation unit 1704. There is a limit for the number of image feature vectors to be held for each person ID, and a limit number is determined in advance. When the limit number is exceeded, an oldest held image feature vector is deleted from image feature vectors of a person ID.

The first vector group obtaining unit 1706 is configured by the center vector obtaining unit 1707 and the neighbor vector group obtaining unit 1708. The center vector obtaining unit 1707 obtains a generated image feature vector from the vector generation unit 1704. Meanwhile, the neighbor vector group obtaining unit 1708 selects from the image feature vector holding unit 1705 one or more image feature vectors close in an inter-vector distance to the image feature vector obtained in the center vector obtaining unit. It is necessary that a person ID of a facial image represented by an image feature vector to be selected is different from a person ID of a facial image represented by the image feature vector obtained by the center vector obtaining unit.

The second vector group obtaining unit 1709 obtains from the image feature vector holding unit 1705 an image feature vector group close in an arbitrarily-selected inter-vector distance. It is necessary that there are a plurality of person IDs of a facial image represented by an image feature vector to be selected and that one or more person is different from the person ID of the facial image represented by the image feature vector obtained in the first vector group obtaining unit 1706.

<Operation of Apparatus>

The learning processing and the processing for a learning step in the fourth embodiment are the same as those in the first embodiment, and thus description thereof will be omitted. However, the processing for generation of a pseudo image feature vector (step S205) is different.

[Processing for Generating Pseudo Image Feature Vector]

FIG. 19 is a detailed flowchart for generation of a pseudo image feature vector. The following processing is executed by the units 1706 to 1713 included in the learning apparatus of FIG. 17.

In step S1101, the learning apparatus obtains the image feature vector generated in step S201 as a center vector configuring a first vector group. In step S1102, the learning apparatus obtains from the image feature vector holding unit 1705 one or more image feature vectors as a neighbor vector group configuring the first vector group. Specifically, one or more image feature vectors close in an inter-vector distance to the image feature vector obtained in step S1101 are obtained as a neighbor vector group.

In step S1103, the learning apparatus obtains a second vector group. More specifically, an image feature vector group close in an arbitrarily-selected inter-vector distance is obtained from the image feature vector holding unit 1705.

In step S1104, the learning apparatus calculates a projection destination vector from the first vector group obtained in steps S1101 and S1102 and a projection source vector from the second vector group obtained in step S1103. In step S1105, the learning apparatus calculates the transformation matrix A satisfying Equation (1) with respect to the projection destination vector $u_X$ and the projection source vector $u_Y$. In step S1106, the learning apparatus generates a pseudo representative vector by performing transformation using the transformation matrix A on an arbitrary vector included in the second vector group.

<Effects>

As described above, according to the fourth embodiment, it is determined whether a person is a similar but different person based on an inter-vector distance between image feature vectors representing facial images in a feature space. This configuration makes it possible to select a more suitable image feature vector in processing for generating a pseudo image feature vector, which makes it possible to generate a more appropriate pseudo image feature vector.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141650, filed Aug. 31, 2021 which is hereby incorporated by reference herein in its entirety.

What is claimed is:

1. An information processing apparatus for generating image training data comprising:
    a processor; and
    a memory containing instructions that, when executed by the processor, cause the processor to function as:
    a first obtaining unit configured to obtain one or more image feature vectors related to a first category, from a vector group including a plurality of image feature vectors, each associated with a category;
    a second obtaining unit configured to obtain from the vector group one or more image feature vectors, at least one related to a second category different from the first category;
    a calculation unit configured to calculate a transformation matrix for converting a projection source vector obtained based on an image feature vector obtained by the second obtaining unit into a projection destination vector obtained based on an image feature vector obtained by the first obtaining unit; and
    a generation unit configured to generate image training data by generating a pseudo image feature vector related to a third category different from the first category and the second category by performing conversion processing on one or more image feature vectors included in the image feature vectors obtained by the second obtaining unit using the transformation matrix.

2. The information processing apparatus according to claim 1, further comprising:
    a vector generation unit configured to generate an image feature vector representing a feature of an image from the image; and
    a holding unit configured to hold a plurality of image feature vectors generated based on a plurality of images by the vector generation unit as the vector group.

3. The information processing apparatus according to claim 2, further comprising:
    an updating unit configured to update a generation parameter to be used for generation of an image feature vector by the vector generation unit, wherein
    the updating unit updates the generation parameter so as to reduce an inter-vector distance between image feature vectors belonging to the same category, increase an inter-vector distance between image feature vectors belong to different categories, and increase an inter-vector distance between an arbitrary image feature vector included in the vector group and the pseudo image feature vector.

4. The information processing apparatus according to claim 3, wherein
    the vector generation unit generates an image feature vector from an image using a neural network, and
    the generation parameter is a weighting coefficient of the neural network.

5. The information processing apparatus according to claim 1, wherein
a first calculation means calculates the projection destination vector based on an average of the image feature vectors obtained by the first obtaining unit, and
a second calculation means calculates the projection source vector based on an average of the image feature vectors obtained by the second obtaining unit.

6. The information processing apparatus according to claim 3, further comprising:
a second holding unit configured to hold as a second vector group a plurality of representative vectors, each an image feature vector associated with a category and representing a related category, wherein
the first obtaining unit and the second obtaining unit obtain a representative vector from the second vector group, and
the generation unit generates a pseudo representative vector representing the third category.

7. The information processing apparatus according to claim 6, further comprising:
a second updating unit configured to update the second vector group held by the second holding unit based on the pseudo representative vector generated by the generation unit.

8. The information processing apparatus according to claim 7, further comprising:
a third updating unit configured to update the pseudo representative vector generated by the generation unit, wherein
the third updating unit updates so as to reduce an inter-vector distance between a neighbor pseudo representative vector within a predetermined inter-vector distance from an arbitrary image feature vector included in the vector group and the arbitrary image feature vector.

9. A learning apparatus, comprising:
the information processing apparatus according to claim 1; and
a learning unit configured to perform learning using at least the pseudo image feature vector generated by the information processing apparatus.

10. A method for controlling an information processing apparatus for generating image training data, the method comprising:
first obtaining in which one or more image feature vectors related to a first category are obtained from a vector group including a plurality of image feature vectors, each related to a category;
second obtaining in which one or more image feature vectors, at least one related to a second category different from the first category, are obtained from the vector group
calculating a transformation matrix for converting a projection source vector obtained based on an image feature vector obtained in the second obtaining into a projection destination vector obtained based on an image feature vector obtained in the first obtaining; and
generating image training data by generating a pseudo image feature vector related to a third category different from the first category and the second category by performing conversion processing on one or more image feature vectors included in the image feature vectors obtained in the second obtaining using the transformation matrix.

11. A non-transitory computer-readable recording medium storing a program for causing a computer to execute a method for controlling an information processing apparatus for generating image training data, the method comprising:
first obtaining in which one or more image feature vectors related to a first category are obtained from a vector group including a plurality of image feature vectors, each related to a category;
second obtaining in which one or more image feature vectors, at least one related to a second category different from the first category, are obtained from the vector group
calculating a transformation matrix for converting a projection source vector obtained based on an image feature vector obtained in the second obtaining into a projection destination vector obtained based on an image feature vector obtained in the first obtaining; and
generating image training data by generating a pseudo image feature vector related to a third category different from the first category and the second category by performing conversion processing on one or more image feature vectors included in the image feature vectors obtained in the second obtaining using the transformation matrix.

* * * * *